(No Model.) 2 Sheets—Sheet 1.

L. PUSEY, Dec'd.
S. M. Knox, Administrator.
ICE MAKING APPARATUS.

No. 596,123. Patented Dec. 28, 1897.

Witnesses: Walter C. Pusey. Ira S. Heller

Inventor. Lea Pusey. per Joshua Pusey. Attorney.

(No Model.) 2 Sheets—Sheet 2.
L. PUSEY, Dec'd.
S. M. KNOX, Administrator.
ICE MAKING APPARATUS.
No. 596,123. Patented Dec. 28, 1897.
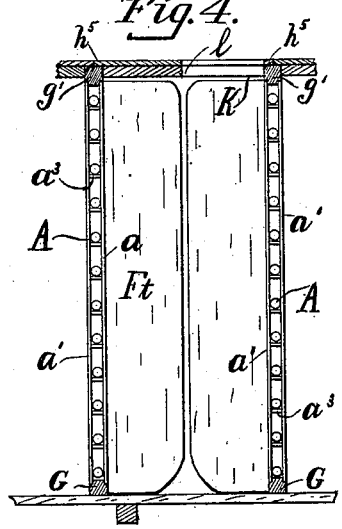
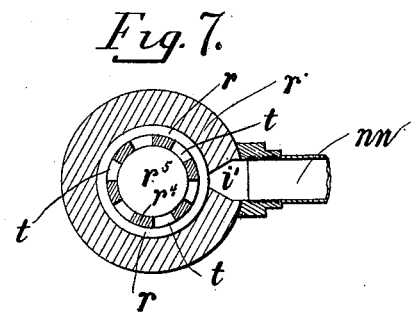
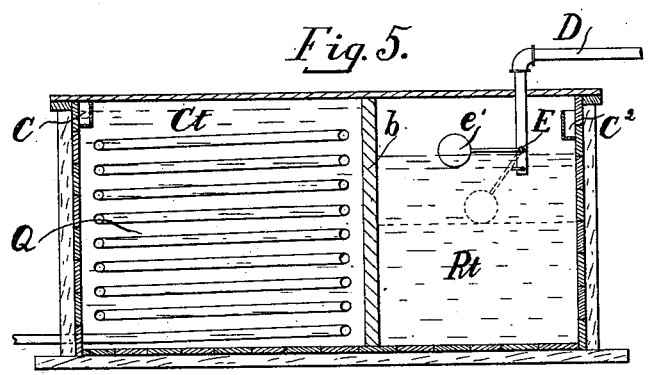
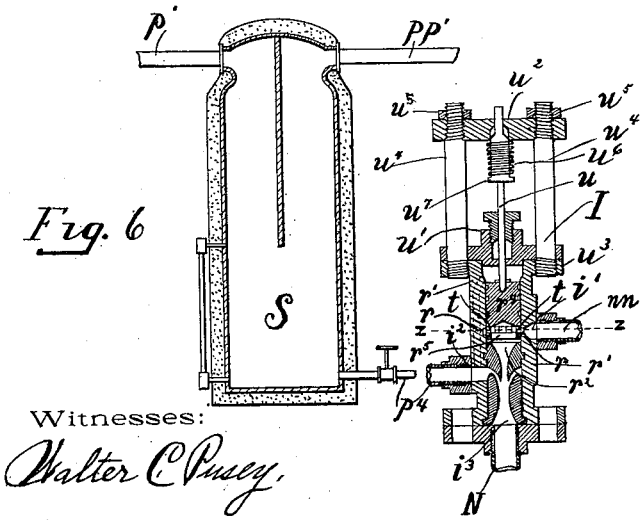
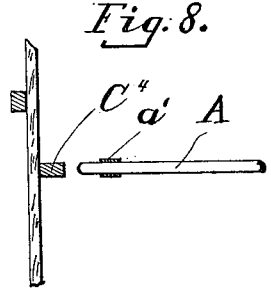
Witnesses:
Walter C. Pusey,
Ira S. Heller
Inventor.
Lea Pusey,
per Joshua Pusey,
Attorney

UNITED STATES PATENT OFFICE.

LEA PUSEY, OF WILMINGTON, DELAWARE; SAMUEL M. KNOX ADMINISTRATOR OF SAID PUSEY, DECEASED.

ICE-MAKING APPARATUS.

SPECIFICATION forming part of Letters Patent No. 596,123, dated December 28, 1897.

Application filed August 20, 1895. Serial No. 559,923. (No model.)

*To all whom it may concern:*

Be it known that I, LEA PUSEY, a citizen of the United States, residing at the city of Wilmington, in the county of New Castle and State of Delaware, have invented certain new and useful Improvements in Ice-Making Apparatus, of which the following is a full, clear, and exact description, reference being had to the accompanying drawings, of which—

Figure 1:
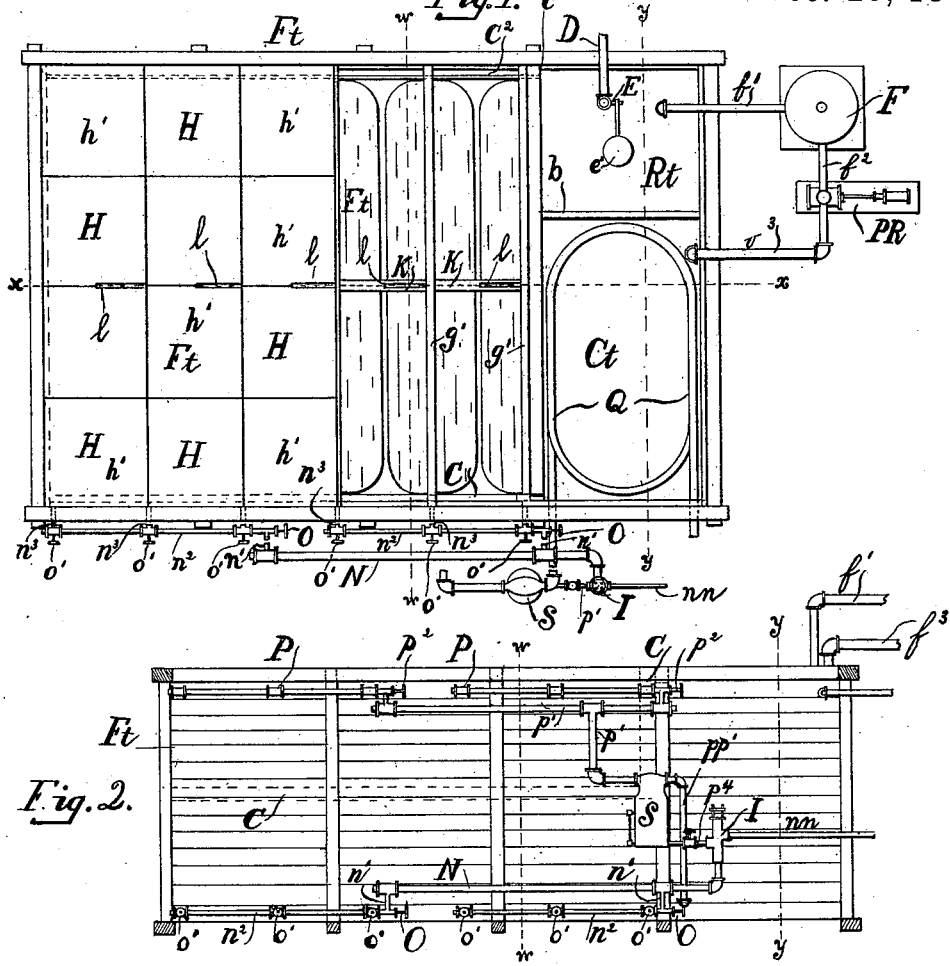
Figure 2:
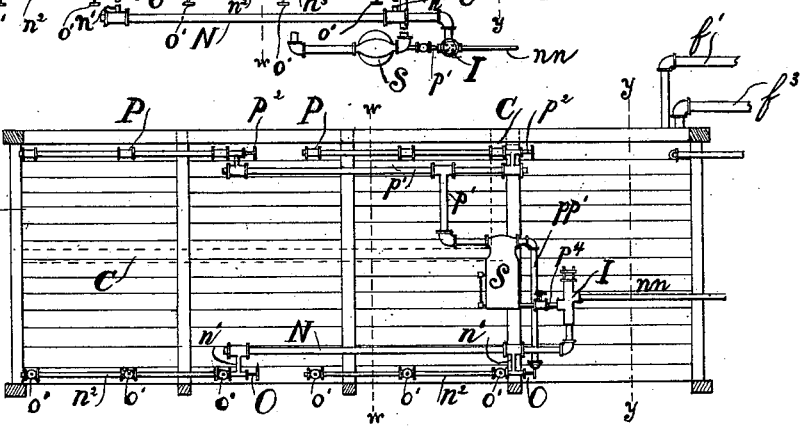
Figure 3:
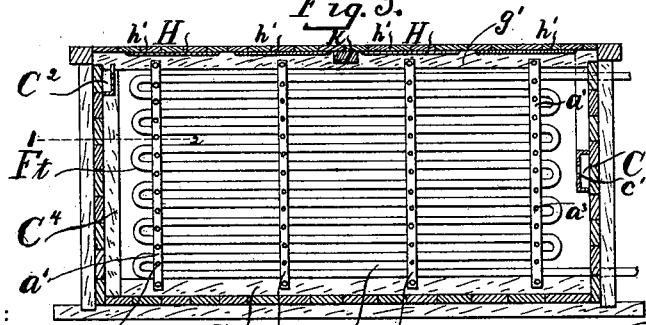

Figure 1, Sheet 1, is a plan view, part of the cover of the main or freezing tank and the pipes and adjuncts along the upper part of said tank having been removed. Fig. 2 is front side elevation; Fig. 3, a transverse section on line $w\ w$, Fig. 1; Fig. 4, Sheet 2, a vertical section on line $x\ x$, Fig. 1, through two adjacent freezing-coils and main tank; Fig. 5, a section on line $y\ y$, Figs. 1 and 2; Fig. 6, an enlarged section through the separator and also, more enlarged, through the injector; Fig. 7, a horizontal section, enlarged, through the injector, as on line $z\ z$, Fig. 6; Fig. 8, a section on line 1 2, Fig. 3.

This invention relates more particularly to the ice-making apparatus and system such as described in Letters Patent of the United States No. 491,225, issued to me February 7, 1893. Its object is to improve the construction and operation of such apparatus in various particulars wherein I found the same to be more or less deficient.

These features of improvement consist of means for securing automatic regulation of the supply of water to the freezing-tank, whereby while the circulating system is maintained as described in my said patent the water is kept at a proper uniform level.

They consist also of means for maintaining uniform pressure of the liquid ammonia in and on its way from the receiver to the freezing-coils; also, in means or devices for separating the liquid ammonia, which is carried over with the gas from the freezing-coils, and returning the same into the conduit leading to the said freezing-coils.

The improvements also relate to various details of construction hereinafter described and particularly pointed out.

Referring to the annexed drawings, forming part of this specification, $Ft$ is the main, strongly-made, water-containing tank, (hereinafter called the "freezing-tank,") in which are arranged transversely the usual series of coils A, Figs. 3 and 4, at proper distances apart, through which the ammonia or other refrigerating agent is caused to pass. At one end of this tank are two compartments separated therefrom and divided by a transverse partition $b$, Figs. 1 and 5. One of these compartments (marked $Rt$) will be termed the "receiving-tank," and the other, $Ct$, the "cooling-tank." The latter communicates with the main or freezing tank by way of a conduit C, that starting in the present instance from the top corner of the cooling-tank descends within the freezing-tank to a point midway between the top and bottom thereof and then extends horizontally along one side of the latter tank, as seen in Fig. 3 and indicated by dotted lines in Fig. 1. This conduit is provided with apertures $c'$, Fig. 3, at intervals opening toward the interspaces between the freezing-coils A.

$C^2$, Figs. 1, 3, and 5, is an overflow-conduit running near the top of the freezing-tank on the side opposite to the conduit C. This conduit has lateral notches or inlet-openings between the coils of pipe, and it communicates with and empties into the receiving-tank at $C^3$, Fig. 1. D is a pipe emptying into the latter tank. Through it flows the water from the source of supply. It is provided with a cock or valve E, Figs. 1 and 5, that is adapted to be operated by an ordinary ball-float $e'$ by the level of the water in the usual manner.

F, Fig. 1, is the tightly-covered filter-tank, which communicates at the top with the interior of the receiving-tank $Rt$ by a pipe $f'$. P R, Fig. 1, is an ordinary suction-pump, to which leads a pipe $f^2$ from the bottom of the filter. An efflux-pipe $f^3$ leads from the pump and empties into the cooling-tank.

The water is drawn continually from the receiving-tank by the action of the pump into the filter, whereby it is cleansed and deaerated substantially in the manner described in my aforesaid Letters Patent. It passes thence by way of pipe $f^3$ into the cooling-tank, wherein its temperature is lowered, as hereinafter described. The overflow runs from this latter tank by way of the conduit C into the freezing-tank. The overflow from the freezing-tank passes along the trough C² into the receiving-tank. Thus a constant uniform circulation of the water is maintained in the freezing-tank.

Each of the series of freezing-coils rests upon a wooden strip G, Figs. 3 and 4, say about four to five inches in height and running lengthwise with the coil. The main purpose of these strips, which are poor heat-conductors, is to serve as insulators, so that the ice will not be formed below the coils—that is, at the bottom of the tank—to any considerable extent—that is, to the full thickness seen in Fig. 4—thereby greatly facilitating the removal of the ice. The tops of the coils are also attached to and supported by longitudinal strips $g'$, Figs. 1, 3, and 4, whose ends are fastened to the sides of the tank. The top of the latter is covered by a series of lids H, one for each space between the freezing-coils. I usually make up each cover of several sections $h'$, preferably four. These covers or sections are provided with lateral offsets $h^5$, Fig. 4, which rest upon the cross-strips $g'$, to which the top parts of the freezing-coils are secured. In order to steady these coils in position, I place midway between each two a cross-stay K, Figs. 1, 3, and 4, against which the adjacent cut-away sections of the lids may abut. These stays may be made detachable by resting their end portions in suitable mortises or seats in the strips $g'$ or in any other suitable manner. A narrow vertical slot $l$, Figs. 1 and 4, is cut through the stays K, so that a rule may be inserted therethrough from time to time in order to measure the thickness of ice being formed. The abutting ends or edges of the lid-sections may, if necessary, be slightly cut away to expose these slots.

Opposite the end of each of the coils A on the side of the freezing-tank, along the upper part of which runs the overflow-conduit C², is a vertical piece C⁴, Figs. 3 and 8, which projects inwardly from the side of the tank some distance from the end of the coil. As the freezing operation proceeds the ice formed about the end of each coil contiguous to said vertical pieces soon forms with the latter what may be termed a "partition," which cuts off the passage-way on that side from the several spaces between the coils. Consequently the proper circulation or flow of the water is facilitated or insured, as the course will be along the interspaces from the inlet side of the tank to the overflow C². The ammonia or other freezing agent being caused to pass through the coils A the ice will be formed on both sides of the latter, as seen in Figs. 1 and 4, and preferably just before the approaching sides of the bodies of ice of adjacent coils meet each other the supply of the freezing agent is cut off, and the ice is ready for harvesting.

It will of course be understood that while the harvesting operation is proceeding and the level of the water falls in the receiving-tank the float $e'$ descends accordingly and so opens the cock or valve of the supply-pipe, and when the ice has been harvested the float and valve will have returned to their usual position, the water having regained its normal level.

I have found no little difficulty in making ice on a large scale with an apparatus such as that described and having a considerable number of freezing-coils in securing uniformity and suitable economy in the freezing action. To obviate this difficulty, I devised a construction shown in Figs. 1 and 2 of the annexed drawings and which I shall now proceed to describe.

The ammonia or like freezing agent condensed into liquid form comes from the usual receiver (not shown) by way of a pipe N, which extends along a part of the front side, near the bottom, outside of the freezing-tank. This pipe connects by pipes $n'$ with pipes $n^2$, each of which latter connects by pipes $n^3$ with several (in the present instance groups of three) of the freezing-coils. The flow or pressure of the ammonia from the supply-pipe N into the pipes $n^2$ may be regulated or entirely cut off by a hand-valve O. There is a similar valve or cock $o'$ for regulating or cutting off the flow or pressure from pipe $n^2$ into the respective freezing-coils of a group. I term these connecting pipes and valves "manifolds." When the freezing is ready to begin, the valves O are adjusted to the general conditions or pressure of the ammonia, while adjustment of the pressure for each coil may, if necessary, be made from time to time by means of the valves $o'$. In this way I am enabled to secure practical uniformity of pressure and so of ice-making be the number of coils or the length of the tank or the pressure of the ammonia from the receiver what it may.

The expanded or gaseous ammonia from the freezing-coils passes from the latter into pipes P, Fig. 2, near the top, thence by way of pipe $p'$ to the usual compressor or absorber. The said pipes and groupings are similar to those for the liquid ammonia, &c.; but there are no valves in the pipes P, excepting at $p^2$, for each of said pipes. The valves O and $p^2$ are also used when it is desirable to entirely shut off the ammonia from one or more of the groups of coils. The valves $p^2$ are also sometimes useful in order to increase temporarily the back pressure of the ammonia within the coils at the starting of the freezing in any one of the groups, so that the freezing shall not proceed too rapidly and by, so to say, entrapping the air, producing clouded or white ice.

In lieu of allowing the gas to pass directly to the compressor or absorber I cause the same to flow on its way through a pipe-coil Q, placed within the tank $Ct$, whereby the water therein will be considerably cooled before flowing over into the freezing-tank. I also employ, in connection with the pipe manifold system above described, apparatus for reducing and regulating the pressure of the liquid ammonia in the supply-pipe between the ammonia-receiver and the freezing-coils, also for injecting into said pipe—that is, returning to the circulation—any excess of liquid ammonia carried over from the freezing-coils.

A general view of this apparatus, showing its relative position, is found in Figs. 1 and 2, Sheet 1, and in detail in the sections Figs. 6 and 7, Sheet 2. It consists of a connected "separator" and injector. The latter is marked I and in general principles of construction and operation does not materially differ from ordinary injectors. It has two inlet-openings and one outlet. One of the former, $i'$, communicates with the ammonia-receiver by way of a pipe $n\ n$, the other, $i^2$, with the bottom of the separator S by pipe $p^4$. The outlet $i^3$ communicates with the freezing-coils by way of pipe N. The separator is substantially the same in construction as those well known and in use for steam and other vapors. It therefore requires no special description. The expanded or gaseous ammonia flows from pipe $p'$ into the top part of the separator, thence on to the compressor or absorber by way of pipe $p\ p'$, or, rather, in the present instance through the coil of pipe Q, which is connected to pipe $p'$ within the cooling-tank. Such of the liquid ammonia as may have been carried over falls to the bottom of the separator and thence passes to the injector by way of the pipe $p^4$. The inlet $i'$ from the receiver opens into a groove or circular cavity $r$, Figs. 6 and 7, in the wall of the cylinder $r'$, which cavity opens to the chamber $r^2$. The latter is of the usual tapering or nozzle form, as shown. The inlet from the separator opens into the chamber $r^2$ near the point of the nozzle, as seen in Fig. 6. The liquid from the receiver, rushing through the nozzle, carries with it the liquid from the separator, which is thus, so to say, returned to the circulation and passes on with the main body to the freezing-coils.

It is essential that the liquid passing on to the coils should be maintained at as nearly a uniform pressure as possible, notwithstanding the pressure variations that, maybe, exist as it comes from the receiver. In order to secure this desideratum, I provide within the chamber $r^2$ of the injector a spring-controlled piston $r^4$, the construction, arrangement, and operation of which are such that the piston acts as a cut-off and thus to regulate the entrance of the liquid within the chamber according to the pressure within the pipe from the receiver. To this end there is a circular cavity $r^5$ in the forward end of the piston, which opens in front toward the injector-nozzle. There is also communication between the concavity $r$ (into which opens the inlet from the ammonia-receiver) by way of a number of peripheral orifices or ports $t$, as indicated in Fig. 6 and clearly shown in Fig. 7. The piston has a stem $u$, which passes through a guide and a stuffing-box in a head $u'$ and also works in a head $u^2$, which latter, as also the head $u'$, is secured to a flange $u^3$ of the injector-cylinder by means of screw-bolts $u^4$ and nuts $u^5$. A spiral spring $u^6$ on the stem bears against an offset $u^7$ thereon and tends to force the piston downwardly—that is, toward the injector-nozzle. The piston may be longitudinally adjusted by means of the nuts $u^5$, the same having been adjusted at the outset with relation to the groove $r$, so that the ports $t$ are open to an extent that will give, say, for example, a pressure of seventy-five pounds in the pipe leading to the freezing-coils, the pressure from the receiver being, say, one hundred and sixty pounds and that from the separator, say, ten pounds. Now if the pressure of the liquid from the receiver should rise the back pressure against the piston would cause it to retract against the stress of the spring $u^6$, and thus the area of the ports $t$ would be contracted and consequently the supply and the pressure of the liquid within the injector-chamber would diminish and the working pressure within the freezing-coils would remain substantially unaffected.

I remark that the water from the source of supply may be discharged directly into the cooling-tank and overflow therefrom into the receiving-tank and the water from the receiving-tank be pumped therefrom through the filter and thence discharged directly into the freezing-tank or the conduit C.

Having thus described the construction and mode of operation of my invention, I claim as new and desire to secure by Letters Patent—

1. In an ice-making apparatus of the class recited, the combination with a freezing-tank, a series of pipe-coils therein for the freezing agent, a supply-pipe for said coils, and valved connections whereby uniformity of pressure may be obtained in said coils, an efflux-pipe from said coils, a separator into which said pipe empties, an injector connected to the lower portion of said separator, to the said supply-pipe, and also to the receiver, and means in said injector for regulating automatically the pressure of the discharge therefrom into the influx-pipe, substantially as specified.

2. In an ice-making apparatus of the class recited the combination with the main tank having the freezing-coils therein for the freezing agent, of the separator into which empties the efflux-pipe from the said coils, the injector connected to the lower portion of said separator, to the influx-pipe for said coils, and also to the receiver, and means in said injector for regulating automatically the pressure of the discharge therefrom into said influx-pipe, substantially as specified.

3. In an ice-making apparatus of the class recited, the combination with the main tank having the freezing-coils therein, and the influx and efflux pipes therefor, of the separator into which the efflux-pipe discharges, the injector connected to said separator, and also to said influx-pipe and to the receiver, and a spring-controlled compensatory piston within said injector and arranged to control the inlet thereto from the receiver, and thereby the pressure of the discharge from the injector into the influx-pipe, substantially as specified.

In testimony whereof I have hereunto affixed my signature in the presence of two subscribing witnesses.

LEA PUSEY.

Witnesses:
FRANCIS H. HOFFECKER,
J. S. BODDY.